United States Patent
Baars et al.

(10) Patent No.: US 7,138,203 B2
(45) Date of Patent: *Nov. 21, 2006

(54) APPARATUS AND METHOD OF MANUFACTURE OF ELECTROCHEMICAL CELL COMPONENTS

(75) Inventors: Dirk M. Baars, South Windsor, CT (US); Hillary P. Borges, Pomfret Center, CT (US); Seung B. Chun, Pomfret Center, CT (US)

(73) Assignee: World Properties, Inc., Lincolnwood, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/638,117

(22) Filed: Aug. 7, 2003

(65) Prior Publication Data

US 2004/0076863 A1    Apr. 22, 2004

Related U.S. Application Data

(63) Continuation-in-part of application No. 10/053,346, filed on Jan. 18, 2002, now abandoned.

(60) Provisional application No. 60/263,010, filed on Jan. 19, 2001, provisional application No. 60/262,991, filed on Jan. 19, 2001.

(51) Int. Cl.
*H01M 2/08* (2006.01)
*H01M 8/04* (2006.01)
*H01M 2/14* (2006.01)

(52) U.S. Cl. .................. 429/36; 429/26; 429/38

(58) Field of Classification Search .......... 429/26, 429/38, 22, 36

See application file for complete search history.

(56) References Cited

U.S. PATENT DOCUMENTS

| | | | |
|---|---|---|---|
| 3,012,086 A | 12/1961 | Vahldieck | 136/86 |
| 3,134,696 A | 5/1964 | Douglas et al. | 136/86 |
| 3,134,697 A | 5/1964 | Niedrach | 136/86 |
| 3,188,242 A | 6/1965 | Kordesch et al. | 136/86 |
| 3,497,389 A | 2/1970 | Berger et al. | 136/86 |
| 3,623,913 A * | 11/1971 | Adlhart et al. | 429/20 |
| 4,098,967 A | 7/1978 | Biddick et al. | 429/210 |
| 4,175,165 A | 11/1979 | Adlhart | 429/30 |
| 4,265,727 A | 5/1981 | Beckley | 204/242 |
| 4,545,926 A | 10/1985 | Fouts, Jr. et al. | 252/511 |

(Continued)

FOREIGN PATENT DOCUMENTS

EP    0 109 824 B1    5/1984

(Continued)

OTHER PUBLICATIONS

JP 2000-077079; Publication Date Mar. 14, 2000 (Translation of abstract only).

*Primary Examiner*—Patrick Joseph Ryan
*Assistant Examiner*—Thomas H. Parsons
(74) *Attorney, Agent, or Firm*—Cantor Colburn LLP

(57) ABSTRACT

A component for an electrochemical cell comprises a thermally and electrically conductive core, wherein the conductive core comprises apertures, and wherein the conductive core further comprises an active area substantially covered by an electrically and thermally conductive polymeric composite. The conductive polymeric composite is adhered to the core by an adhesion promoter comprising electrically conductive particles to reduce the volume resistivity of the component, and an optional adhesive composition. Components may be manufactured having a volume resistivity of about 0.500 ohm-cm or less and a thermal conductivity of at least about 5 watts/meter ° K. In addition, the component is economical to produce due to inexpensive starting materials as well as the use of conventional processing equipment.

15 Claims, 5 Drawing Sheets

U.S. PATENT DOCUMENTS

| | | | |
|---|---|---|---|
| 4,565,684 A | 1/1986 | Tibbetts et al. | 423/447.3 |
| 4,572,813 A | 2/1986 | Arakawa | |
| 4,575,432 A | 3/1986 | Lin et al. | 252/511 |
| 4,610,808 A | 9/1986 | Kleiner | 252/512 |
| 4,663,230 A | 5/1987 | Tennent | 428/367 |
| 4,824,871 A | 4/1989 | Shinomura | 521/53 |
| 4,832,990 A | 5/1989 | Boccalon et al. | 427/388.1 |
| 4,885,457 A | 12/1989 | Au | 219/548 |
| 4,938,833 A | 7/1990 | Kaufman et al. | 156/309.6 |
| 4,988,583 A | 1/1991 | Watkins et al. | 429/30 |
| 5,024,818 A | 6/1991 | Tibbetts et al. | 422/158 |
| 5,165,909 A | 11/1992 | Tennent et al. | 423/447.3 |
| 5,183,594 A | 2/1993 | Yoshinaka et al. | 252/518 |
| 5,194,307 A | 3/1993 | Gardeski | 428/40 |
| 5,223,568 A | 6/1993 | Landi et al. | 524/571 |
| 5,250,228 A * | 10/1993 | Baigrie et al. | 252/511 |
| 5,272,017 A | 12/1993 | Swathirajan et al. | 429/33 |
| 5,352,289 A | 10/1994 | Weaver et al. | 106/476 |
| 5,468,574 A | 11/1995 | Ehrenberg et al. | 429/33 |
| 5,475,048 A | 12/1995 | Jamison et al. | 524/439 |
| 5,498,372 A * | 3/1996 | Hedges | 252/511 |
| 5,521,018 A | 5/1996 | Wilkinson et al. | 42/26 |
| 5,565,072 A | 10/1996 | Faita et al. | 204/256 |
| 5,578,388 A | 11/1996 | Faita et al. | 429/30 |
| 5,591,382 A | 1/1997 | Nahass et al. | 252/511 |
| 5,591,832 A | 1/1997 | Koshijima et al. | 530/500 |
| 5,629,098 A | 5/1997 | Poutasse et al. | 428/626 |
| 5,677,074 A | 10/1997 | Serpico et al. | 429/43 |
| 5,679,482 A | 10/1997 | Ehrenberg et al. | 429/249 |
| 5,709,957 A | 1/1998 | Chiang et al. | 428/615 |
| 5,728,283 A | 3/1998 | Reuter et al. | 204/499 |
| 5,741,609 A * | 4/1998 | Chen et al. | 429/307 |
| 5,750,197 A | 5/1998 | van Ooij et al. | 427/318 |
| 5,798,188 A | 8/1998 | Mukohyama et al. | 429/34 |
| 5,830,326 A | 11/1998 | Iijima | 204/173 |
| 5,904,797 A | 5/1999 | Kwei | 156/307.3 |
| 5,952,118 A | 9/1999 | Ledjeff et al. | 429/32 |
| 6,103,413 A | 8/2000 | Hinton et al. | 429/32 |
| 6,132,851 A | 10/2000 | Poutasse | 428/209 |
| 6,146,780 A | 11/2000 | Cisar et al. | 429/34 |
| 6,183,714 B1 | 2/2001 | Smalley et al. | 423/447.3 |
| 6,248,467 B1 | 6/2001 | Wilson et al. | 429/39 |
| 6,251,308 B1 | 6/2001 | Butler | 252/511 |
| 6,261,710 B1 | 7/2001 | Marianowski | 429/34 |
| 6,281,275 B1 | 8/2001 | Sanduja et al. | 524/401 |
| 6,372,376 B1 | 4/2002 | Fronk et al. | 429/41 |
| 2002/0001743 A1 | 1/2002 | Davis | 429/34 |

FOREIGN PATENT DOCUMENTS

| | | |
|---|---|---|
| EP | 0 297 888 B1 | 1/1989 |
| EP | 0 975 039 A2 | 1/2000 |
| EP | 1 035 608 A2 | 9/2000 |
| EP | 1 107 340 A2 | 6/2001 |
| EP | 1 227 531 A1 | 7/2002 |
| GB | 2 359 186 | 8/2001 |
| GB | 2359186 * | 8/2001 |
| JP | 61296067 | 12/1986 |
| JP | 62138549 | 6/1987 |
| JP | 2000-77079 | 3/2000 |
| WO | WO 98/20572 | 5/1998 |
| WO | WO 99/04929 | 2/1999 |
| WO | WO 99/57949 | 11/1999 |
| WO | WO 99/67845 | 12/1999 |
| WO | WO 00/63303 | 10/2000 |
| WO | WO 01/18895 A1 | 3/2001 |
| WO | WO 03/009408 A1 | 1/2003 |

* cited by examiner

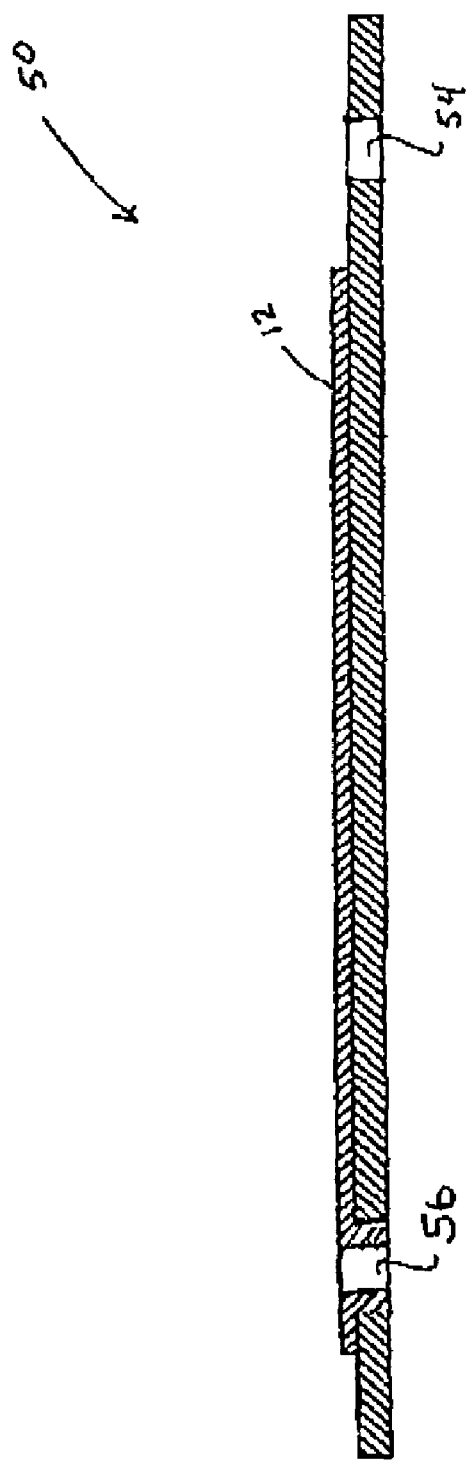

APPARATUS AND METHOD OF MANUFACTURE OF ELECTROCHEMICAL CELL COMPONENTS

CROSS REFERENCE TO RELATED APPLICATIONS

This application is a continuation-in-part of U.S. application Ser. No. 10/053,346, filed Jan. 18, 2002 (now abandoned), which claims the benefit of Provisional Application Ser. No. 60/263,010 filed Jan. 19, 2001, U.S. application Ser. No. 60/262,991 filed Jan. 19, 2001, all of the foregoing applications being incorporated herein by reference in their entirety, including incorporated material.

BACKGROUND OF THE INVENTION

This invention relates to electrochemical cells, and in particular to electrochemical cell components and materials useful in the manufacture of electrochemical cell components.

Electrochemical cells may be classified as either electrolysis cells or fuel cells. Electrolysis cells act as hydrogen generators by electrolytically decomposing water to produce hydrogen and oxygen gases. Fuel cells function by electrochemically reacting a fuel gas such as hydrogen with an oxidant gas such as air or oxygen to generate electricity. A preferred type of electrochemical cell is the "proton exchange membrane" cell, wherein the cathode of the cell is separated from the anode by a proton exchange membrane that facilitates the diffusion of ions and/or water between the cathode and anode, but prohibits the diffusion of fuel and oxidant gases.

The typical electrochemical cell includes a number of individual cells arranged in a stack, with the working fluid directed through the cells via input and output conduits formed within the stack structure. The cells within the stack are sequentially arranged, each including a cathode, a proton exchange membrane, and an anode. Membrane electrode assemblies (MEA) for use in fuel cells are well known, being described for example in U.S. Pat. Nos. 5,272,017 and 3,134,697, which are incorporated by reference herein. The MEA for each cell, sandwiched between electrically conductive gas diffusion layers, is placed between a pair of electrically conductive elements or plates which serve as current collectors for the anode/cathode, and which generally contain an array of grooves in the faces thereof for distributing the gaseous reactants (a fuel gas such as $H_2$ and an oxidant gas such as $O_2$ or air) over the surfaces of the anode and cathode. Such plates are described, for example, in U.S. Pat. Nos. 4,988,583, 5,521,018, and 6,261,710B1. The gaseous reactants are usually saturated, typically with water. Each cathode/membrane/anode assembly (hereinafter "membrane electrode assembly", or "MEA") is typically supported on both sides by flow fields comprising screen packs. Such flow fields facilitate fluid movement and membrane hydration and provide mechanical support for the MEA.

A plurality of such cells may be stacked together as a fuel cell stack and connected in electrical series. The stack of cells is also called a "fuel cell" in the art. The cells are separated from each other by an impermeable, electrically conductive plate referred to as a bipolar plate. The bipolar plate thus serves as an electrically conductive separator element between two adjacent cells, and generally also has reactant gas distributing grooves on both external faces thereof. In most cases the bipolar plate also has internal passages through which coolant flows to remove heat from the stack. In the electrochemical cell environment, the active areas of the exterior faces of the bipolar plates are in constant contact with often highly corrosive, acidic solutions at elevated temperatures. Moreover, at least one of the electrode faces may be polarized in the presence of pressurized, saturated air or hydrogen. To survive in such an environment, the bipolar plates must be able to withstand these pressures and be highly resistant to corrosion and degradation. In addition to the bipolar plates placed between each fuel cell, end plates may be necessary to contain the fuel cell stack. The end plates must withstand the same corrosive environment as the bipolar plates.

Bipolar plates are often fabricated from graphite or corrosion resistant metals. Graphite is lightweight, corrosion resistant, and electrically conductive but is also quite brittle and thus prone to cracking, and mechanically difficult to handle, thus increasing production costs. Additionally, graphite is porous, making it very difficult to make the very thin, gas-impervious plates that are desirable for low-weight, low-volume fuel cell stacks. The graphite plates must also be operably connected to the other components by seal rings. Typically the seal ring material contains plasticizers and additives that leach out over time and contaminate the catalyst. Catalyst contamination generally halts energy production. Graphite plates also have relatively low heat conductivity, which does not allow heat generated in the cell to be conducted laterally to the edges of the cell by thermal conductivity. Graphite plates must then be further complicated by having coolant liquid channels formed in them.

Corrosion-resistant metals are generally more electrically conductive but these materials typically have low thermal conductivity and, similar to graphite, bipolar plates formed from these materials also require coolant liquid channels.

Accordingly, there is a perceived need in the art for electrically and thermally conductive, low cost components for electrochemical cells, particularly bipolar plates and end plates, with high mechanical integrity and high chemical resistance.

BRIEF SUMMARY OF THE INVENTION

The above described drawbacks and deficiencies in the prior art are overcome by a component for an electrochemical cell comprising a thermally and electrically conductive core with an active area substantially covered by a thermally and electrically conductive polymeric composite adhered to the core by an adhesion promoter. Preferably the conductive polymeric composite has a coefficient of thermal expansion substantially matching the core material. For the purpose of this specification, the coefficients of thermal expansion are substantially matched if the electrochemical cell component can be cycled through the normal fuel cell temperature cycle or between the curing temperature of the material and the lowest temperature specified for the fuel cell, and the stress caused by differential expansion and/or contraction does not pull the polymeric composite from the core, cause the polymeric composite to crack, or otherwise allow corrosive material to reach the core, or cause the electrochemical cell component to bow as the temperature is cycled. Use of an adhesion promoter alleviates the tendency of the core and the conductive polymeric composite to debond, despite any disparity in dimensional stability of the core and the conductive polymeric composite, surprisingly without significant decrease in either electrical or thermal conductivity of the component. The conductive polymeric composite preferably comprises a thermosetting polybutadiene- or polyisoprene-based resin system and an electrically conductive filler.

In still another embodiment, a component for an electrochemical cell comprises a thermally and electrically conductive core with an active area substantially covered by the above-described thermally and electrically conductive polymeric composite, wherein the adhesion promoter disposed between and in intimate contact with the core and the composite comprises conductive particles in an amount and of a type effective to reduce the volume resistivity of the component, preferably to about 0.050 ohm-centimeter (ohm-cm) or less, and more preferably about 0.030 ohm-cm or less. The conductive particles are selected from a wide group, including conductive metals, intermetallics, non-metals, and combinations of the foregoing. Silver, nickel, silver-coated glass spheres, and nickel-coated graphite are preferred.

In another embodiment, a component for use in an electrochemical cell comprises an electrically and thermally conductive core having an aperture therethrough, the core further comprising an active area; and an electrically and thermally conductive polymeric composite substantially covering the active area of the conductive core and adhered to the core by an adhesion promoter.

The above discussed and other features and advantages of the present invention will be appreciated and understood by those skilled in the art from the following detailed description.

BRIEF DESCRIPTION OF THE DRAWINGS

FIG. 12 is a cross sectional drawing of a heat conducting plate.

DETAILED DESCRIPTION OF THE PREFERRED EMBODIMENTS

Figure 1:
FIGS. 1 and 2 are cross sectional drawings of heat conducting plates.

A component for an electrochemical cell comprises a thermally and electrically conductive core having an active area substantially covered by a thermally and electrically conductive polymeric composite adhered to the core by an adhesion promoter. Preferably, the component is an electrically conductive support such as a bipolar or end plate. Typically the high filler loadings required to make a polymeric composite electrically conductive severely decreases the adhesion of the conductive polymeric composite to a substrate such as the conductive core described herein. Use of a thin layer of an adhesion promoter between the core and the conductive polymeric composite alleviates the tendency of the core and the polymer to debond, despite any disparity in the dimensional stability of the core and the polymer layers, and surprisingly without significant decrease in either electrical or thermal conductivity. As described above, the coefficients of thermal expansion of the core and the conductive polymeric composite are substantially matched.

The active area is defined as the area of the core and polymeric composite adjacent to the corrosive cell environment. Substantially covered is defined as covered over at least 98% of the surface exposed to the corrosive environment, preferably covered over at least 99% of the surface exposed to the corrosive environment and most preferably covered over 99.9% of the surface exposed to the corrosive environment. The surface of the conductive polymeric composite should be substantially free of pinholes and cracks that might allow corrosive material to attack the core. The conductive polymeric composite may be patterned or unpatterned. The conductive polymeric composite preferably has a minimum thickness ("$t_{min}$") over the core to prevent material from the corrosive environment from attacking the core material. $t_{min}$ is preferably less than about 1.3 millimeters (mm), more preferably less than about 0.6 millimeters, and most preferably less than about 0.4 millimeters.

Parts of the core may be left uncoated in areas where the core must be sealed, or in areas of the core where heat may be transferred to a heat transfer fluid. Heat transfer fluids (or cooling fluids) include both liquids and gases. Advantageously, the high thermal conductivity of the electrochemical cell component allows the heat generated by the cell to be laterally conducted and transferred to circulating fluids such as air thus reducing the complexity of the component and its manufacture.

The component is resistant to chemical attack and hydrolysis and has excellent mechanical strength and toughness. Components may be manufactured having a volume resistivity of about 0.001 to about 1.0 ohm-cm, and preferably have a resistivity of about 0.500 ohm-cm or less, preferably about 0.116 ohm-cm or less, and more preferably about 0.045 ohm-cm or less. The thermal conductivity is about 3 to about 25 watts/meter ° K, preferably at least about 5 watts/meter ° K, more preferably at least about 7 watts/meter ° K, and most preferably at least about 13 watts/meter ° K.

FIG. 1 shows a cross sectional drawing of an embodiment of a heat conducting plate 10 having an electrically and thermally conducting polymeric composite 12 adhered over an active area of core 16 as a protective coating. In general, the thermal conductivity of heat conducting plate 10 is much greater than that of polymeric composite 12. An area 14 of heat conducting plate 10 is shown left uncovered for later use as a heat transfer area. Preferably, the thermal conductivity of heat conducting plate 10 is great enough that there is little temperature gradient along the surface of heat conducting plate 10, and there is sufficient conductivity to remove heat generated by the fuel cell in the active area to heat transfer area 14 for removal to ambient air with a cooling system such as a simple fan cooling system. Although heat conducting plate 10 is shown in cross section as a parallel plate with flat surfaces of active area and heat transfer area 14 coplanar, the invention is not limited to such a cross section. In particular, the active areas and heat transfer areas need not be flat. For heat transfer area 14 to conduct heat generated by the cell in the active area, however, the part of the substrate connecting the active area to heat transfer area 14 must be a sufficiently good heat conductor.

Figure 2:
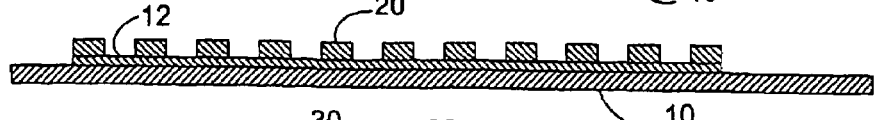

FIG. 2 shows an embodiment of FIG. 1 with an additional material 20 disposed on top of polymeric coniposite 12 to form channels for channeling fuel or oxidant gases. In this view, the additional material 20 disposed on top of the polymeric composite 20 forms a channel that is non-conformal to the underlying conductive core shown herein as conductive plate 10. Additional material 20 should be sufficiently heat and electrically conductive to conduct the heat and electricity generated in the fuel cell with little loss in voltage and little temperature gradient. Additional material 20 may be identical to polymeric composite 12, or may be a different material.

Figure 3:
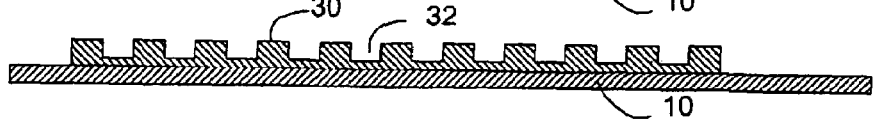
FIG. 3 is a cross sectional drawing of a heat conducting plate with channels.

FIG. 3 shows an embodiment of the invention where thermally and electrically conducting material 30 is bonded to heat conducting plate 10 and molded to have channels 32.

Figure 4:
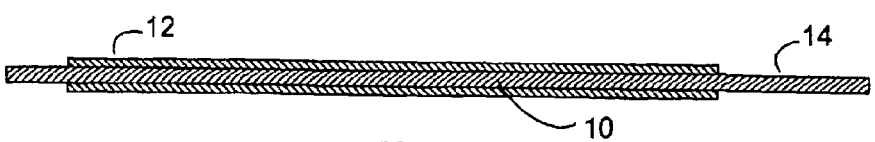
FIGS. 4–6 are cross sectional drawings of bipolar plates.
Figure 5:
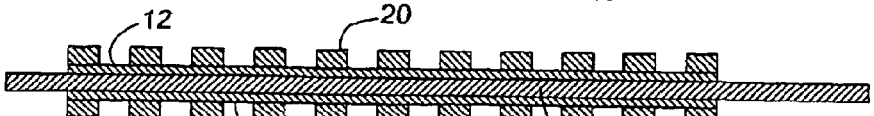
Figure 6:
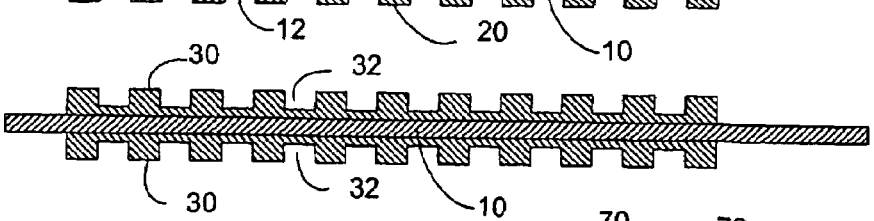

FIGS. 4, 5 and 6 show embodiments similar to those of FIGS. 1–3, but have conductive polymeric composite 12 on both sides of heat conducting plate 10 to make a bipolar plate.

Figure 7:
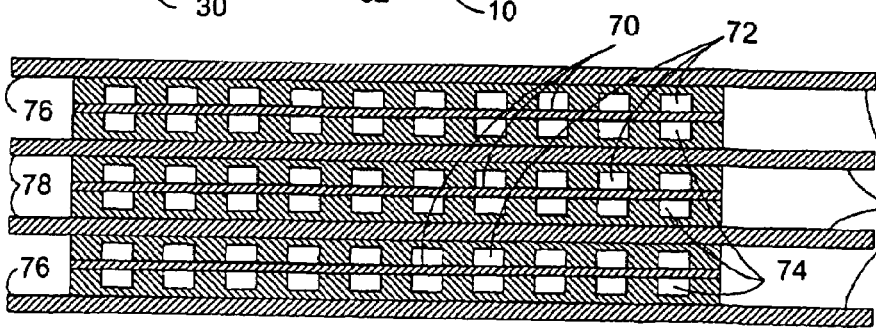
FIG. 7 is a schematic representation of a fuel cell stack.

FIG. 7 shows a sketch of a fuel cell stack. MEA's 70 are sandwiched between bipolar plates 78 to form fuel gas channels 72 and oxidant gas channels 74. Two endplates 76 and two bipolar plates 78 are shown. Each MEA 70 is shown as a single layer, even though it comprises multiple layers of electrode, catalyst material, and membrane ion transport material. Heat transfer areas 14 of each plate are shown in cross section to be a series of fins that can be easily air cooled by fan cooling means. Other cooling means such as liquid cooling means are also anticipated by the inventors for cooling the fins shown in FIG. 7.

Figure 8:
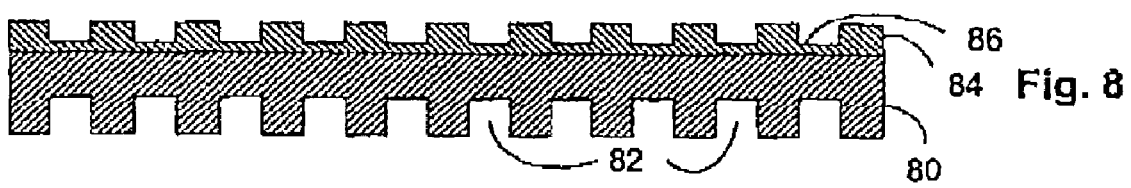
FIG. 8 is a schematic representation of a heat conducting plate with coolant channels.

FIG. 8 shows a sketch of a metal or other heat conducting plate 80 formed with channels 82 which will later form coolant channels. Protective polymeric composite 84 is shown molded onto plate 80 with channels 86 which will later form fuel or oxidant gas channels.

Figure 9:
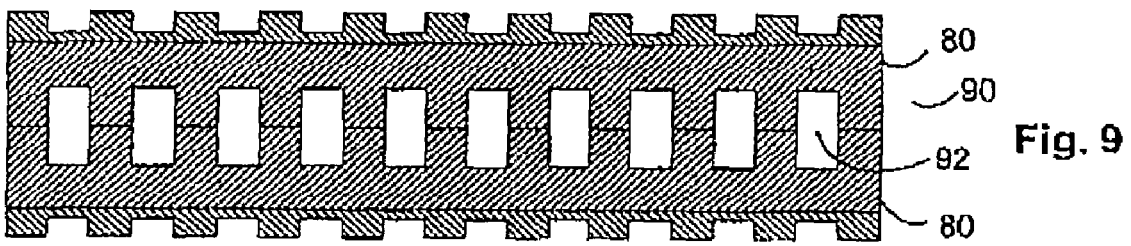
FIG. 9 is a schematic representation of a bipolar plate.

FIG. 9 shows two of plates 80 of FIG. 8 joined to form a bipolar plate 90 with channels 92 for channeling coolant fluids such as water or oil or air or another gas.

Figure 10:
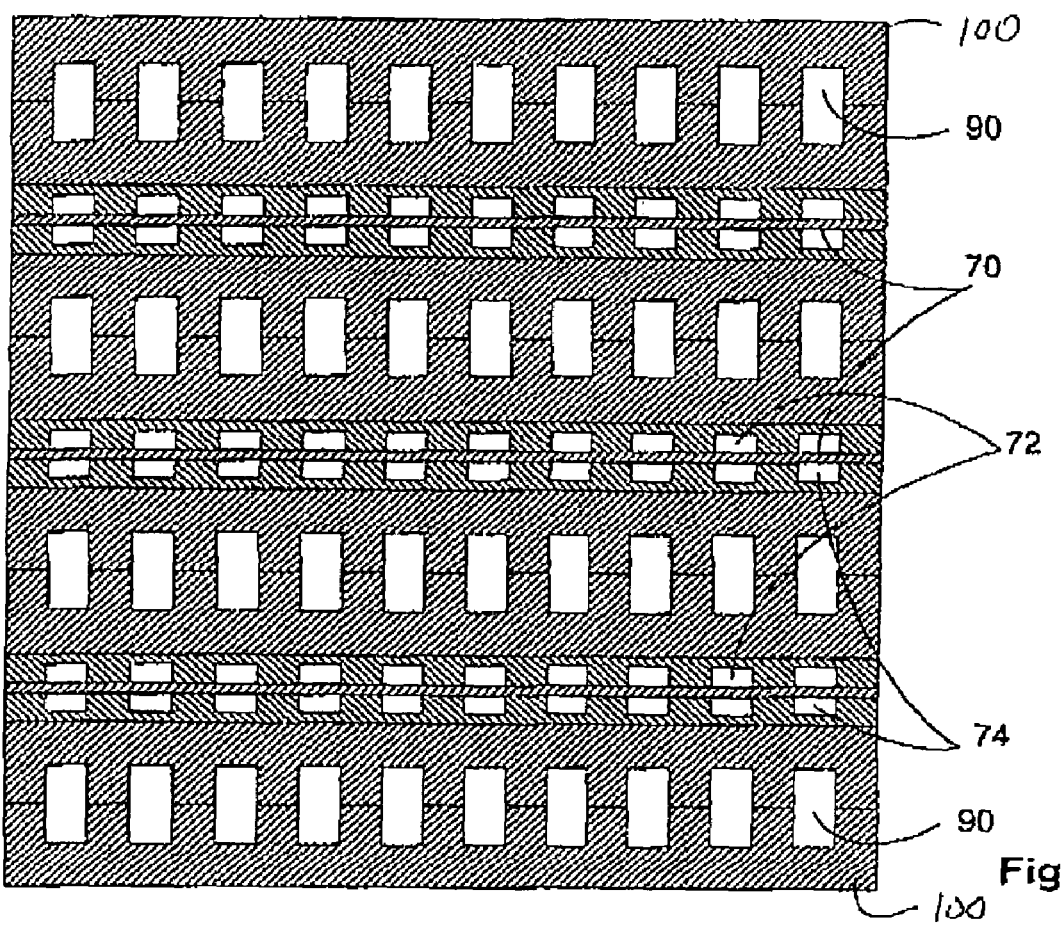
FIGS. 10 and 11 are schematic representations of fuel cell stacks.

FIG. 10 shows a fuel cell stack having two bipolar plates 90 such as sketched in FIG. 9 sandwiched between MEA's 70, as well as two end plates 100 formed in the same manner as shown in FIG. 9.

Figure 11:
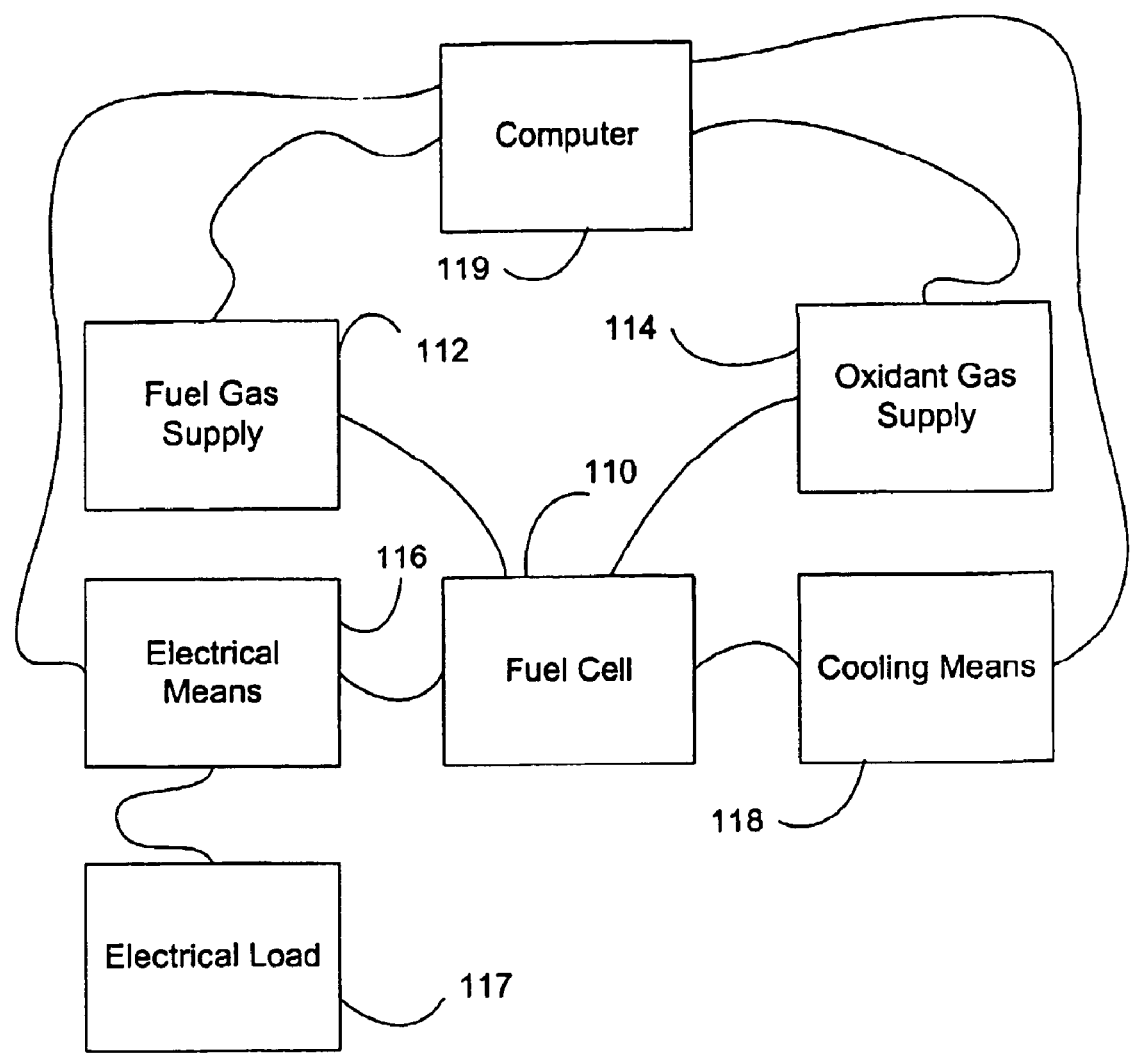

FIG. 11 shows a sketch of a fuel cell stack 110 connected to sources 112 and 114 of fuel and oxidant gases respectively. An electrical means 116 for conditioning electricity produced by fuel cell stack 110 and an electric load 117 for using the electricity are shown connected to the fuel cell stack 110 by appropriate electrical connections. A cooling means 118 for cooling fuel cell stack 110 is shown connected to fuel cell stack 110 by appropriate cooling lines. Control means 119 controls fuel, oxidant, electrical conditioning, and cooling. Control means 119 may be separated in each function, or may be centralized in one central location as by a computer or other microprocessor, or may be any combination of microprocessors and/ or controllers connected to control the system.

Additionally, the core may comprise one or more holes, slits, or apertures therethrough, so as to enable the physical passage of exhaust gases. One example of this embodiment is shown in FIG. 12, where a heat conducting plate 50 comprises an electrically and thermally conducting polymer composite 12 adhered to a core 52, wherein the core comprises first aperture(s) 54. The electrically and thermally conductive composite is preferably adhered to all surfaces that form the first aperture(s), thereby forming second aperture(s) 56 therethrough wherein second aperture(s) 56 are of a smaller diameter than first aperture(s) 54, as shown in FIG. 12. The features of FIG. 12 may be used in combination with the other features as described in FIGS. 1–11 and 13.

Cross sectional sketches shown in FIGS. 1–10 and 12 should not be considered as limiting the invention. In particular, fuel and oxidant channels are shown running in the same direction for clarity of expression, even though they may run at right angles and/or have complicated serpentine and branching channels.

The core material is electrically conductive and has high thermal conductivity as well. The core material may be metal, non-metallic, or a combination of metallic and non-metallic materials. Useful metal cores comprise aluminum and aluminum alloys, nickel and nickel alloys, copper, copper alloys, platinum, magnesium, magnesium alloys, gold-plated metals, and stainless steel. The core material preferably has a coefficient of thermal expansion that closely matches the coefficient of thermal expansion of the molded composite. Additionally, core materials with a comparatively low density such as aluminum are preferred due to the resulting decrease in the weight of the fuel cell. The desired dimensions of the electrochemical cell component typically dictate the dimensions and shape of the core. Typically, the shape and dimension of the component depend upon the structure of the electrochemical cell as well as the contemplated end use of the electrochemical cell. In general, however, the component has thickness usually about 1 mm to about 15 mm thick and length l and width w greater than about 10 centimeters (cm) to about 15 cm. Similarly, the thickness of the core also varies. Typical thickness is about 0.01 cm to about 0.25 cm, depending on the amount of heat to be carried. The thickness is usually much smaller than the length and width of the core. The final shape and geometry of the core will be dictated by requirements of electrochemical cell design.

Useful adhesion promoters include those capable of adhering to both the surface of the core and the conductive polymeric coating. Examples include various compounds comprising chromium, silicon, titanium, or zirconium, and mixtures comprising at least one of the foregoing compounds, as well as compositions that form polymers upon cure. The adhesion promoter may further, or alternatively, comprise a wide variety of inherently conductive polymers, for example polyacetylane, polythiophene, polypyrrole, polyaniline, poly-p-phenylenevinylene, their derivatives, and combinations of one or more of the foregoing. Polyaniline-grafted-lignin, such as Ligno Pani™ obtainable from GeoTech Chemical, is especially preferred for reactivity and conductivity. When present, the inherently conductive polymer is present in an amount of about 0.1 wt % to about 20 wt %, based on the total weight of the adhesion promoter. Within this range, the adhesion promoter comprises less than or equal to about 15 wt %, preferably less than or equal to about 10 wt % and more preferably less than or equal to about 5 wt % of inherently conductive polymer, based on the total weight of the adhesion promoter. Also within this range, the adhesion promoter comprises greater than or equal to about 0.5 wt %, preferably greater than or equal to about 1 wt % and more preferably greater than or equal to about 2 wt % of inherently conductive polymer, based on the total weight of the adhesion promoter.

Adhesion promoters may be used in the form of thin films applied in an amount of less than about 0.10 grams per square meter ($g/m^2$), with less than about 0.01 $g/m^2$ preferred. A combination of adhesion promoters may be used, preferably in the form of individual layers disposed between the core and the polymeric composite.

A useful chromium-containing adhesion promoter is described, for example, in U.S. Pat. No. 5,904,797 to Kwei, which discloses using chromium (III) methacrylate/polyvinyl alcohol solutions to improve bonding between thermoset resins and hydrophilic surfaces.

Useful compounds comprising titanium include, but are not limited to, monoalkoxy titanates such as tetra-n-butoxy titanium, isopropyl tri(N-ethylaminoethylamino) titanate, isopropyl tri-isostearoyl titanate and titanium di(dioctylpyrophosphate) oxyacetate; coordinate titanates such as tetraisopropyl di(dioctylphosphito)titanate; and neoalkoxy titanates such as neoalkoxy tris(dodecanoyl) benzenes sulfonyl zirconate, neoalkoxy tri(p-N-(beta-aminoethyl)aminophenyl)titanate. Other types include chelate, quaternary, and cycloheteroatom titanates.

Useful compounds comprising zirconium include, but are not limited to, neoalkoxy zirconates such as neoalkoxy trisneodecanoyl zirconate, neoalkoxy tris(dodecanoyl) benzene sulfonyl zirconate, neoalkoxy tris(m-aminophenyl) zirconate, ammonium zirconium carbonate and zirconium propionate.

Useful compounds comprising silicon include a wide variety of silanes. One type of useful silane is represented by the formula $$R_{4-n}SiK_n \qquad (I)$$

wherein R is an alkyl or aryl group, or a functional group represented by the formula $$C_xH_{2x}Y \qquad (II)$$

wherein x is from 0 to 20 and Y is selected from the group consisting of amino, amido, hydroxy, alkoxy, halo, mercapto, carboxy, acyl, vinyl, allyl, styryl, epoxy, isocyanato, glycidoxy, and acryloxy groups. K is a hydrolyzable group, such as alkoxy (e.g., methoxy, ethoxy, and the like), phenoxy, acetoxy, and the like, or halogen (e.g., chlorine); and n is 1, 2, 3, or 4, and preferably n is 3. The adhesion promoters represented by formula (I) include halosilanes, aminoalkoxysilanes, aminophenylsilanes, phenylsilanes, heterocyclic silanes, N-heterocyclic silanes, acrylic silanes, and mercapto silanes. Mixtures of two or more silanes also are useful. In one embodiment K is OR wherein R is an alkyl group containing up to about 5 carbon atoms or an aryl group containing up to about 8 carbon atoms. In other embodiments x is an integer from 0 to 10 and more often from 1 to about 5.

The adhesion promoter can be an epoxy silane represented by the formula

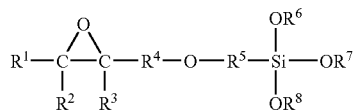

(III)

wherein: $R^1$, $R^2$ and $R^3$ are independently hydrogen or hydrocarbon groups; $R^4$ and $R^5$ are independently alkylene or alkylidene groups; and $R^6$, $R^7$ and $R^8$ are independently hydrocarbon groups. The hydrocarbon groups preferably contain 1 to about 10 carbon atoms, more preferably 1 to about 6 carbon atoms, more preferably 1 to about 4 carbon atoms. These hydrocarbon groups are preferably alkyl. The alkylene or alkylidene groups $R^4$ and $R^5$ preferably contain from 1 to about 10 carbon atoms, more preferably 1 to about 6 carbon atoms, more preferably 1 to about 4 carbon atoms, more preferably 1 or 2 carbon atoms. The alkylene and alkylidene groups can be methylene, ethylene, propylene, and the like.

The adhesion promoter can also be an acrylic silane represented by the formula

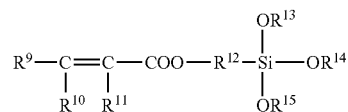

(IV)

wherein: $R^9$, $R^{10}$ and $R^{11}$ are independently hydrogen or hydrocarbon groups; $R^{12}$ is an alkylene or alkylidene group; and $R^{13}$, $R^{14}$ and $R^{15}$ are independently hydrocarbon groups. The hydrocarbon groups preferably contain 1 to about 10 carbon atoms, more preferably 1 to about 6 carbon atoms, more preferably 1 to about 4 carbon atoms. These hydrocarbon groups are preferably alkyl (e.g., methyl, ethyl, propyl, and the like). The alkylene and alkylidene groups preferably contain from 1 to about 10 carbon atoms, more preferably 1 to about 6 carbon atoms, more preferably 1 to about 4 carbon atoms. The alkylene groups include methylene, ethylene, propylene, and the like The adhesion promoter additionally can be an amino silane represented by the formula

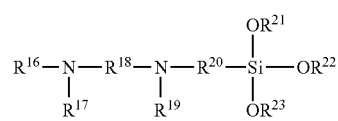

(V)

wherein: $R^{16}$, $R^{17}$ and $R^{19}$ are independently hydrogen or hydrocarbon groups; $R^{18}$ and $R^{20}$ are independently alkylene or alkylidene groups; $R^{21}$, $R^{22}$ and $R^{23}$ are independently hydrocarbon groups; and n is 0 or 1. The hydrocarbon groups preferably contain 1 to about 10 carbon atoms, more preferably 1 to about 6 carbon atoms, more preferably 1 to about 4 carbon atoms. These hydrocarbon groups are preferably alkyl (e.g., methyl, ethyl, propyl, and the like). The alkylene and alkylidene groups preferably contain from 1 to about 10 carbon atoms, more preferably 1 to about 6 carbon atoms, more preferably 1 to about 4 carbon atoms. The alkylene groups include methylene, ethylene, propylene, and the like Mercapto silane adhesion promoters can be represented by the formula

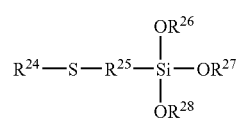

(VI)

wherein $R^{24}$ is hydrogen or a hydrocarbon group; $R^{25}$ is an alkylene or alkylidene group; and $R^{26}$, $R^{27}$ and $R^{28}$ are independently hydrocarbon groups. The hydrocarbon groups preferably contain 1 to about 10 carbon atoms, more preferably 1 to about 6 carbon atoms, more preferably 1 to about 4 carbon atoms. These hydrocarbon groups are preferably alkyl (e.g., methyl, ethyl, propyl, and the like). The alkylene and alkylidene groups preferably contain from 1 to about 10 carbon atoms, more preferably 1 to about 6 carbon atoms, more preferably 1 to about 4 carbon atoms. These groups are preferably alkylene (e.g., methylene, ethylene, propylene, and the like).

Vinyl adhesion promoter can be represented by the formula

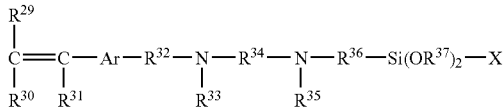

(VII)

wherein: $R^{29}$, $R^{30}$, $R^{31}$, $R^{33}$ and $R^{37}$ are independently hydrogen or hydrocarbon groups; $R^{32}$, $R^{34}$ and $R^{36}$ are independently alkylene or alkylidene groups; each $R^{37}$ is independently a hydrocarbon group; Ar is an aromatic group; and X is a halogen. The hydrocarbon groups preferably contain 1 to about 10 carbon atoms, more preferably 1 to about 6 carbon atoms, more preferably 1 to about 4 carbon atoms. The hydrocarbon groups are preferably alkyl (e.g., methyl, ethyl, propyl, and the like). The alkylene and alkylidene groups preferably contain from 1 to about 10 carbon atoms, more preferably 1 to about 6 carbon atoms, more preferably 1 to about 4 carbon atoms. These groups are preferably alkylene (e.g., methylene, ethylene, propylene, and the like). The aromatic group Ar can be mononuclear (e.g., phenylene) or polynuclear (e.g., naphthylene) with the mononuclear groups and especially phenylene being preferred. The halogen, X, is preferably chlorine or bromine, more preferably chlorine.

Finally, the adhesion promoter can be a bis-silane represented by the formula

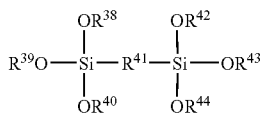

(VIII)

wherein $R^{38}$, $R^{39}$, $R^{40}$, $R^{42}$, $R^{43}$ and $R^{44}$ are independently hydrocarbon groups; $R^{41}$ is an alkylene or alkylidene group; and n is 0 or 1. The hydrocarbon groups preferably contain 1 to about 10 carbon atoms, more preferably 1 to about 6 carbon atoms, more preferably 1 to about 4 carbon atoms. These hydrocarbon groups are preferably alkyl (e.g., methyl, ethyl, propyl, and the like). The alkylene and alkylidene group preferably contains from 1 to about 10 carbon atoms, more preferably 1 to about 6 carbon atoms, more preferably 1 to about 4 carbon atoms. $R^{41}$ group is preferably alkylene (e.g., methylene, ethylene, propylene, and the like).

Curable compositions that form organic polymers upon cure are generally used in the form of thin films applied in an amount of greater than about 0.50 g/m², preferably greater than about 1.0 g/m². Preferably, such adhesion promoters improve the bond strength between the core and the polymeric composite without significantly adversely affecting the electrical or thermal conductivity of the component. Suitable adhesion promoters of this type may comprise, for example, epoxy resins, such as the epoxy resins, phenoxy resins, for example the epoxy and phenoxy resins disclosed in PCT Application No. 99/57949 to Holman, formaldehyde resins, phenol formaldehyde resins, polyester resins, butadiene and acrylonitrile rubbers, polyvinylbutyral resins, and the like. Mixed poly(vinylbutyral)-phenol-formaldehyde resins also are useful. Various alkyd resins that are polyesters may also be used, for example a maleic anhydride-ethylene glycol polyester. Such polyesters may be dissolved in styrene and copolymerized in place under heat with the addition of a small amount of a peroxide initiator. Other useful adhesion promoters of this type include a water-dispersed adhesive composed of a copolymer of acrylonitrile and methacrylate and a phenolic resole, or a solvent-based adhesive composed of a phenolic resole, a polyvinylbutyral resin and a multifunctional epoxy, typically an epoxidized phenolic novolac. U.S. Pat. No. 6,132,851 to Poutasse, for example discloses use of a phenolic resole resin/epoxy resin for improved adhesion. Gardeski, in U.S. Pat. No. 5,194,307, describes an adhesive composition having one or more epoxy components and a high molecular weight polyester component.

One useful adhesion promoter composition comprises a multifunctional epoxy, a difunctional epoxy resin, and at least one compound represented by the formula:

$$R\text{-}(G)_n$$

wherein R is an aromatic, alicyclic or heterocyclic group; G is a functional group selected from the group consisting of COOH, OH, SH, $NH_2$, $NHR^1$, $(NHC(=NH))_mNH_2$, $R^2COOH$, $R^2OH$, $R^2SH$, $R^2NH_2$, and $R^2NHR^1$, wherein $R^1$ is a hydrocarbon group, $R^2$ is an alkylene or alkylidene group and m is an integer of 1 to about 4; and n is a number from 3 up to the number of displaceable hydrogens on R; with the proviso that when at least one G is $NH_2$ or $R^2NH_2$, n is a number ranging from 2 up to the number of displaceable hydrogens on R, and when at last one G is (NHC$(=NH))_mNH_2$, n is a number ranging from 1 up to the number of displaceable hydrogens on R.

The multifunctional epoxies may be those containing an average of more than two epoxy groups (oxirane rings) per molecule. Examples of suitable multifunctional epoxies include epoxy novolac resins (e.g., epoxy cresols and the epoxy phenol novolacs), such as those available under the trade names DEN 438, DEN 439, and TACTIX 785 (each available from Dow), DPS 164 (Shell), and ECN 1299 (Ciba Geigy), trifunctional epoxy resins, such as those available under the trade names TACTIX 742 (Dow Chemical) and PT 810 (Ciba Geigy), and tetrafunctional epoxy resins, such as those available under the trade names MT 0163 (Ciba Geigy), EPON 1031 (Shell), and EPON HPT 1071 (Shell). The multifunctional epoxies typically have average epoxy equivalent weights in the range of about 100 to about 250, wherein an epoxy equivalent weight is the molecular weight of the epoxy molecule divided by the number of epoxy groups in the molecule.

The difunctional epoxy resin can be any difunctional epoxy resin having an average molecular weight in the range of about 1,000 to about 10,000 (epoxy equivalent weight of about 500 to about 5,000). Examples of suitable difunctional epoxy resins include bisphenol A, bisphenol F, bisphenol AD, and the like.

The adhesion promoters may further comprise a composition formed by a two-stage reaction sequence, wherein the first stage includes a reaction between an aziridine cure component and a polyester component. The second stage involves a reaction between the aziridine/polyester component and at least one epoxy component. At least one epoxy component may be selected from a family of electronic grade resins such as tris methane epoxy novolac sold by Dow under the trademark QUATREX 5010, or the flexible novolac products sold by Celanese Corp. under the trademark EPI-REZ 5132 and Dow under the tradename DEN 438. The composition of materials includes a high molecular weight hydroxyl terminated polyester component with minimal carboxylic acid functionality, such as the product sold by DuPont under the trademark 49002 and an aziridine curative component such as the product sold by Cordova Chemical Co., under the trademark XAMA 2 or XAMA 7.

In one embodiment, the adhesion promoter further comprises electrically conductive particles to decrease the resistivity between the core and the composite, preferably without significantly adversely affecting adhesion between the core and the conductive polymeric composite. Suitable conducting particles include, without limitation, carbon, for example carbon fibers such as PAN fibers, coke, natural and synthetic graphite powder, vapor grown carbon fibers, carbon nanotubes, carbon black, metallized graphite and chemically modified, e.g., coated, carbon black with enhanced electrical properties; electrically conductive metals, for example gold, silver, nickel, copper, titanium, aluminum, chromium, tin, iron and the like, as well as alloys containing at least one of the foregoing metals; and particulates fabricated by the vacuum deposition or plating of an electrically conductive metal onto the surface of a ceramic, glass, quartz, or organic resin micropowder. In addition, a few intermetallic chemical compounds such as borides, carbides, and the like, of the foregoing metals, (e.g., titanium diboride) can also serve as metallic constituents of the conductive particles herein. Solid non-metallic, conductive particles such as tin-oxide, indium tin oxide, antimony oxide, and the like may also be included as conductive particles. Specific examples of electrically conductive particles that fit the above descriptions are silver particles, silver-coated aluminum, silver-coated copper, silver-coated solid and hollow glass particles, silver-coated ceramic particles, nickel particles, nickel-coated graphite, carbon, and the like.

The shape of the conductive particles can be irregular, spherical, flake, dendritic flake, or fiber. The average largest dimension of conductive particles such as graphite, carbon black, metal, or metal-coated conductive particles is about 35 to about 150 micrometers. Preferably within this range, the average largest dimension is greater than or equal to about 40 micrometers. Also within this range, the average particle size is preferably less than or equal to about 110 micrometers. This average size can be achieved with single type of particle, or a mixture of particles having various average particle sizes. Silver coated hollow ceramic or glass microspheres are preferred for the combined advantage of low weight, low density, high electrical conductivity (low resistivity), processability, and cost. Nickel flake, nickel coated graphite powder, particularly powder comprising about 60% to about 75% nickel by weight, is preferable for relatively lower filler cost, corrosion resistance, burn resistance, and conductivity.

The conductive particles are added in quantities effective to achieve the desired decrease in resistivity. Combinations of conductive particles may be desirable to maximize the packing density of the particles and thereby maximize the electrical conductivity of the electrical resistance reducing composition. Particular quantities will vary depending on the desired resistivity, the type and shape of the filler, the formulation of the adhesion promoter, and similar considerations. Generally, for graphite, carbon black, metal, or metal-coated fillers, about 10 to about 90 weight percent (wt%) of filler is effective, based on the total weight of the adhesion promoter. Within this range, the conductive particle concentration is greater than or equal to about 20 wt %, more preferably greater than or equal to about 30 wt %, and most preferably greater than or equal to about 40 wt % of the total weight of the adhesion promoter, Also within this range, the conductive filler concentration is preferably less than or equal to about 85 wt %, more preferably less than or equal to about 80 wt %, and most preferably less than or equal to about 75 wt % of the total weight of the adhesion promoter. Where highly conductive particles such as vapor grown carbon fibers or carbon nanotubes are used, alone or in combination with the above fillers, smaller quantities of such particles may be effective, i.e., about 0.1 to about 10 wt % when used alone, or a total conductive particle content of about 0.1 to about 90 wt % when used in combination with graphite, carbon black, metal, or metal-coated conductive fillers.

A particularly preferred adhesion promoter containing conductive particles is commercially available from Alchemetal Corp., Jackson Heights, N.Y., under the trade name "AC-78". This material is believed to contain a prepolymer composition comprising a curable poly(amide-imide) in N-methylpyrrolidone and naphtha, together with nickel and nickel oxide. "AC-78" is further believed to be a conductive prepolymer composition that comprises: (a) from 25 to 99 parts by weight of a poly(amide-imide) prepolymer; (b) from 1 to 25 parts by weight of a trifunctional (meth)acrylate ester; (c) from 0.5 to 15 parts by weight of an amino group containing alkoxysilane having the formula $NH_2(CH_2)_n Si(OC_2H_5)_3$, where n is an integer from 1 to 20, preferably 2 to 10, most preferably 3; and (d) a conductive additive, as described in U.S. Pat. No. 6,281,275.

The reactive poly (amide-imide) is fairly low in molecular weight and is readily soluble in organic solvents. The poly (amide-imide) may be, for example, composed of trimellitic, aromatic amide and aromatic imide moieties. AMOCO Al-10 Polymer, available from AMOCO Oil Company, is a suitable component. As supplied, Al-10 Polymer is approximately 50% in the un-imidized or amic acid form. Other suitable polyamides-imides are set forth in U.S. Pat. No. 4,316,974 to Ohmura et al. and U.S. Pat. No. 5,087,658 to Nishizawa et al. A suitable trifunctional methacrylate ester has the formula $H_3CCH_2C[OC(O)C(CH_3)=CH_2]_3$. A number of different solvents may be used to dissolve the three components to form a prepolymer solution. Among these solvents are 1-methyl 2-pyrrolidone, acetone, formamide, dimethyl formamide, dimethyl sulfoxide and dimethyl acetamide.

Preferably, the coating compositions comprise at least 40 parts by weight of conductive filler as described herein, and most preferably at least 70 parts by weight. Preferably, the coating composition comprises at least 60 parts by weight nickel powder in finely divided form, e.g., at least less than −200 mesh, preferably less than −250 mesh and most desirably less than −325 mesh.

The prepolymer solution and conductive filler is applied to the substrate by spraying while continuously stirring the solution, by equipment well known in the art. Broadly, from 1.0 to 4.0 grams of solution applied per square centimeter of metal substrate to achieve a coating from 0.1 to 2.0 mil thick.

The coated samples are then cured to form the polymeric coating on the substrate. Broadly the coated samples are held at a temperature of from 100 to 300° C. for from 12 to 15 minutes to permit the solvents to be driven off and the polymerization and grafting of the polymer on the metal substrate to take place. Preferably the coated samples are cured at a temperature from 200 to 280° C. for from 5 to 10 minutes and best results are obtained by curing the coated substrates at a temperature of 240 to 250° C. for from 5 to 7 minutes.

The conductive polymeric composite comprises electrically conductive filler dispersed in a resin system and may optionally comprise thermally conductive particles. The conductive polymeric composite is homogeneous. A homogeneous polymeric composite in the sense of this specification excludes heterogeneous composite materials such as materials with an embedded screen or with embedded fibers, which are comparable in length or longer than $t_{min}$, although the inventors anticipate that additional layers of such heterogeneous material may be attached subsequently to the homogeneous material.

When a polymeric coating is formed on a substrate, the polymeric coating may shrink during the cure process, resulting in strong residual stress between the substrate and the polymeric composite. In contrast, the linear shrinkage per unit length of the molded conductive polymeric composite in the X-Y plane is less than or equal to about 0.005, preferably less than or equal to about 0.003, and most preferably less than or equal to about 0.001. Linear shrinkage per unit length of the molded composite is defined by ASTM D-955. Generally speaking it is the amount of shrinkage either in length (Y-direction) or width (X-direction) versus the corresponding original part dimension.

Resins useful in the conductive polymeric composite include, but are not limited to, thermosetting resins, thermoplastic resins and combinations of resin compatible with the conductive filler described herein and capable of withstanding the electrochemical cell environment without degradation or leaching. Compatibility is defined herein as dispersing sufficient conductive filler to achieve the desired volume resistivity for the resulting electrochemical cell component. Preferred resins include epoxidized phenol novolac resins, epoxidized cresol novolac resins, polybutadiene, polyisoprene, polymers comprising repeating units of the formula:

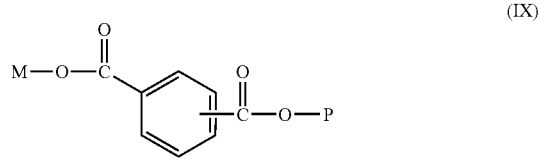

(IX)

wherein P and M may be the same or different alkenes having from 2 to about 6 carbons, such as poly(diallyl phthalate), and combinations comprising at least one of the foregoing resins. A preferred thermosetting polybutadiene- or polyisoprene-based resin system comprises: (1) a polybutadiene or polyisoprene resin; (2) an optional functionalized liquid polybutadiene or polyisoprene resin; (3) an optional butadiene- or isoprene-containing polymer; and (4) an optional low molecular weight polymer. The polybutadiene or polyisoprene resins may be liquid or solid at room temperature. Liquid resins may have a molecular weight greater than 5,000, but preferably have a molecular weight of less than 5,000 (most preferably between 1,000 and 3,000). The preferably liquid (at room temperature) resin portion maintains the viscosity of the composition at a manageable level during processing to facilitate handling, and it also crosslinks during cure. Polybutadiene and polyisoprene resins having at least 90% 1,2-addition by weight are preferred because they exhibit the greatest crosslink density upon cure due to the large number of pendent vinyl groups available for crosslinking. High crosslink densities are desirable because the products exhibit superior performance in the electrochemical cell environment at elevated temperatures. A preferred resin is a low molecular weight polybutadiene liquid resin having greater than 90 wt % 1,2-addition, commercially available from Nippon Soda Co., Ltd under the designation B3000.

The thermosetting polybutadiene- or polyisoprene-based resin system optionally comprises functionalized liquid polybutadiene or polyisoprene resins. Examples of appropriate functionalities for butadiene liquid resins include but are not limited to, epoxy, maleate, hydroxy, carboxyl and methacrylate. Examples of useful liquid butadiene copolymers are butadiene-co-styrene and butadiene-co-acrylonitrile. Possible functionalized liquid polybutadiene resins include Nisso G-1000, G-2000, G-3000; Nisso C-1000; Nisso BN-1010, BN-2010, BN-3010, CN-1010; Nisso TE-2000; and Nisso BF-1000 commercially available from Nippon Soda Co., Ltd. and Ricon 131/MA commercially available from Colorado Chemical Specialties, Inc.

The optional butadiene- or isoprene-containing polymer is preferably unsaturated and can be liquid or solid. It is preferably a solid, thermoplastic elastomer comprising a linear or graft-type block copolymer having a polybutadiene or polyisoprene block, and a thermoplastic block that preferably is styrene or alpha-methyl styrene. Possible block copolymers, e.g., styrene-butadiene-styrene tri-block copolymers, include Vector 8508M (commercially available from Dexco Polymers, Houston, Tex.), Sol-T-6302 (commercially available from Enichem Elastomers American, Houston, Tex.), and Finaprene 401 (commercially available from Fina Oil and Chemical Company, Dallas, Tex.). Preferably, the copolymer is a styrene-butadiene di-block copolymer, such as Kraton D118X (commercially available from Shell Chemical Corporation). Kraton D1118X is a di-block styrene-butadiene copolymer containing 30 volume % styrene.

The butadiene- or isoprene-containing polymer may also contain a second block copolymer similar to the first except that the polybutadiene or polyisoprene block is hydrogenated, thereby forming a polyethylene block (in the case of polybutadiene) or an ethylene-propylene copolymer (in the case of polyisoprene). When used in conjunction with the first copolymer, materials with enhanced toughness can be produced. Where it is desired to use this second block copolymer, a preferred material is Kraton GX1855 (commercially available from Shell Chemical Corp.), which is believed to be a mixture of a styrene-high 1,2 butadiene-styrene block copolymer and a styrene-(ethylene-propylene)-styrene block copolymer.

Thus, in a preferred embodiment, the butadiene- or isoprene-containing polymer comprises a solid thermoplastic elastomer block copolymer having the formula $X_m(Y-X)_n$ (linear copolymer) or

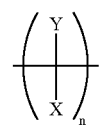

(graft polymer), where Y is a polybutadiene or polyisoprene block, X is a thermoplastic block, and m and n represent the average block numbers in the copolymer, m is 0 or 1 and n is at least 1. The composition may further include a second thermoplastic elastomer block copolymer having the formula $W_p$-$(Z-W)_q$ (linear copolymer) or

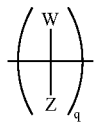

(graft copolymer) where Z is a polyethylene or ethylene-propylene copolymer block, W is a thermoplastic block, and p and q represent the average block numbers in the copolymer, p being 0 and 1 and q being at least 1.

The volume to volume ratio of the polybutadiene or polyisoprene resin to the optional butadiene- or isoprene-containing polymer preferably is between 1:9 and 9:1, inclusive. The selection of the butadiene- or isoprene-containing polymer depends on chemical and hydrolysis resistance as well as the toughness conferred upon the molded material.

The optional low molecular weight polymer resin is generally employed to enhance toughness and other desired characteristics of the conductive polymeric composite. Examples of suitable low molecular weight polymer resins include, but are not limited to, telechelic polymers such as polystyrene, multifunctional acrylate monomers and ethylene propylene diene monomer (EPDM) containing varying amounts of pendant norbornene groups and/or unsaturated functional groups. The optional low molecular weight polymer resin can be present in amounts of about 0 to about 30 wt % of the total resin composition.

Monomers with vinyl unsaturation, sometimes known as cross linking agents, may also be included in the resin system for specific property or processing conditions, such as to decrease the viscosity of the conductive moldable polymeric composite, especially with high filler loading. Viscosity is a key factor in obtaining acceptable molding rheologies. Inclusion of one or more monomers with vinyl unsaturation has the added benefit of increasing cross link density upon cure. Suitable monomers must be capable of co-reacting with one of the other resin system components. Examples of suitable monomers include styrene, vinyl toluene, divinyl benzene, triallylcyanurate, diallylphthalate, and multifunctional acrylate monomers (such as Sartomer compounds available from Arco Specialty Chemicals Co.), among others, all of which are commercially available. The useful amount of monomers with vinyl unsaturation is about 0% by weight to about 80% by weight of the resin composition and preferably about 3% to about 50%.

A curing agent is preferably added to the resin system to accelerate the curing reaction. When the composition is heated, the curing agent decomposes to form free radicals, which then initiate cross linking of the polymeric chains. Preferred curing agents are organic peroxides such as Luperox, dicumyl peroxide, t-butyl perbenzoate, 2,5-dimethyl-2,5-di(t-butyl peroxy)hexane, alpha, alpha-bis(t-butyl peroxy)diisopropylbenzene, and t-butylperoxyhexyne-3, all of which are commercially available. They may be used alone or in combination. Typical amounts of curing agent are from about 1.5 part per hundred parts of the total resin composition (PHR) to about 6 PHR.

Useful conductive fillers comprise the conductive materials described above, in particular metal fillers that do not leach, for example hollow and solid metal-coated glass spheres, pure nickel (Ni), or 316 stainless steel. Carbonaceous conductive fillers are preferred due to their resistance to acid environments. Examples of carbonaceous fillers are carbon fibers such as PAN fibers, coke, natural and synthetic graphite powder, vapor grown carbon fibers, carbon nanotubes, carbon microtubes, carbon black, metallized graphite and chemically modified, e.g., coated carbon black with enhanced electrical properties. Vapor grown carbon fibers are presently manufactured from hydrocarbons in the vapor phase in the presence of particulate metal catalysts at moderate temperatures, i.e., about 800 to about 1500° C., are generally cylindrical, with a hollow core, have diameters from about 3 to about 2000 nanometers, and "tree-ring" or "fishbone" structures. A quantity of pyrolytically-deposited carbon may also be present on the exterior of the fiber. Representative vapor grown carbon fibers described in, for example, U.S. Pat. Nos. 4,565,684 and 5,024,818 to Tibbetts et al.; 4,572,813 to Arakawa; 4,663,230 and 5,165,909 to Tennent; and 5,591,382 to Nahass et al.

Carbon nanotubes are presently produced by laser-evaporation of graphite or carbon arc synthesis, yielding fullerene-related structures, which consist of graphene cylinders that may be open, or closed at either end with caps containing pentagonal and/or hexagonal rings. Nanotubes may consist of a single wall or have multiple concentrically-arranged walls, and have diameters of about 0.7 and about 2.4 nm for the single-wall nanotubes and about 2 to about 50 nanometers for the multi-wall nanotubes. When nanotubes are used it is preferred to have an average aspect ratio greater than or equal to about 5, preferably greater than about 100, more preferably greater than 1000. Representative carbon nanotubes are described in U.S. Pat. Nos. 6,183,714 to Smalley et al., 5,830,326 to Iijima et al., and 5,591,832 to Tanaka et al.

The fillers may be used alone or in combination. Combinations of filler may be desirable to maximize the packing density of the filler and thereby maximize the electrical conductivity of the molded composite. Useful amounts of filler are about 10% to about 90% by volume of the total conductive polymeric composite. Alternately useful amounts of filler are about 19.5 wt % to about 95.0 wt %, preferably about 50 to about 95 wt %, more preferably about 80 to about 95 wt % based on the total weight of the conductive molding polymeric composite. As above, the fillers may have varying particle shapes, sizes and purities. Preferably some or all of the filler is in the form of fibers, microtubes, single wall or multi-wall graphite, single wall or multi-wall carbon nanotubes, platelets, or combinations comprising at least one of the foregoing filler forms. Fibers are herein defined as particles having a length to diameter ratio of at least about 2, preferably at least about 5 and more preferably at least about 100. Fibers having a length to diameter ratio of at least about 400 to about 10,000, which are known as high aspect ratio fillers, are preferred. Nanotubes and microtubes are exemplary high aspect ratio fillers. Platelets are herein defined as particles having two dimensions which are greater that a third dimension by at least a factor of two, preferably by greater than a factor of five. For example, the width and length are individually at least two times greater than the height, or the diameter of a disk-shaped particle is at least two times greater than the height. Platelets may have regular or irregular geometries. Use of filler comprising fiber and/or platelets helps to decrease the amount of shrinkage of the polymeric composite during cure. Particles wherein the longest single linear dimension is about 0.2 to 6000 micrometers may be used. The conductive polybutadiene-or polyisoprene-based composite may further include various other additives for improving thermal conductivity, impact properties, mold-release properties, and thermo-oxidative stability. These additives are generally non-electrically conductive. Thermal conductivity can be improved with the addition of metal oxides, nitrides, carbonates or carbides (hereinafter sometimes referred to as "ceramic additives"). Such additives can be in the form of powders, flakes or fibers. Exemplary materials include oxides, carbides, carbonates, and nitrides of tin, zinc, copper, molybdenum, calcium, titanium, zirconium, boron, silicon, yttrium, aluminum or magnesium; mica; glass ceramic materials; or fused silica. When present, the thermally conducting materials are preferably present between about 60 to about 200 parts of thermally conducting material per 100 parts of total resin ("PHR"), and more preferably about 80 to about 180 PHR. The amounts of the above additives should not impair molding operations.

In general, the conductive polymeric composite is processed as follows. First, all the components (ingredients of the resin system, curing agent, filler and volatile solvent when necessary) are thoroughly mixed in conventional mixing equipment. The mixing temperature is regulated to avoid substantial decomposition of the curing agent (and thus premature cure). Additionally, a small amount of an inhibitor, about 50 to about 350 parts per million by weight of resin, may be added to protect against peroxide decomposition. Mixing continues until the filler is uniformly dispersed through the resin. Additional solvent may be added to facilitate the formation of small particles. The homogenized mixture is then removed, cooled, and dried. If necessary the material may be deagglomerated by passing it through a coarse screen.

The electrochemical cell component is usually made by first lightly abrading or etching the core. Abrading may be accomplished by any method known in the art such as buffing, scrubbing, or grit blasting. Etching may be accomplished by liquid dip, spray etching, electrochemical etching, plasma etching or other chemical etching technique. After abrading or etching the core may be rinsed with an appropriate solvent such as acetone. A dilute solution of the adhesion promoter, optional conductive particles and optional inherently conductive polymer in a suitable volatile solvent, if desired, may then be applied to the cleaned area of the core by dip coating, spray coating or other suitable application methods such as with a brush. An effective concentration of the dilute solution is readily determined by one of ordinary skill in the art, but is typically in the range of about 0.1% to about 9%, preferably about 1% to about 5%. Suitable volatile solvents include acetone, xylene, toluene, methyl ethyl ketone, methyl isobutyl ketone, hexane and higher liquid linear alkanes, particularly acetone and methyl ethyl ketone (MEK), among others. The applied adhesion promoter is allowed to dry under ambient conditions, or by forced or heated air, to form a layer. The layer may be uncured, partially cured, or fully cured in the drying process, or the layer may be partially cured, if desired, by other methods known in the art after drying. Another layer of the same or different adhesion promoter may subsequently be applied in a similar manner.

Alternatively, the adhesion promoter and optional inherently conductive polymer may be applied to the surface of the conductive core, and the solvent optionally removed from the surface of the core, and the optional conductive particles applied to the adhesion promoter by methods such as spray coating. Final drying temperature is dictated by solvent(s) used for any given adhesion promoter or mixtures thereof. Without being bound by theory it is believed that heating at an elevated temperature, i.e., greater than about 35° C., may promote a chemical reaction between the surface of the core and the adhesion promoter that aids in increasing adhesion.

Figure 13A:
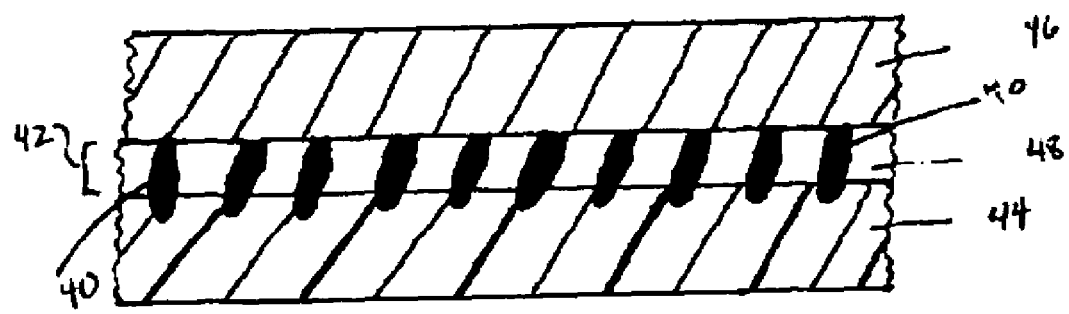
FIGS. 13A and 13B are cross sectional drawings of a heat conducting plate comprising an electrical resistance reducing adhesion promoter.
Figure 13B:
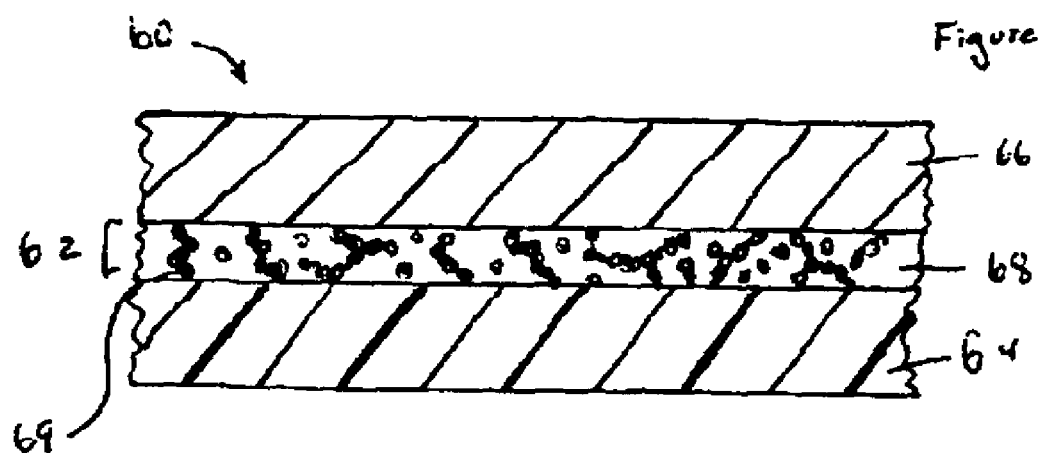

Typically, the adhesion promoting layer has a thickness of about 1 to about 100 micrometers, wherein about 2 micrometers to about 50 micrometers is preferred, and about 5 micrometers to about 20 micrometers is more preferred when conductive particles are present. Use of electrically conductive particles of appropriate size results in an electrical "bridge" between the metal layer and the composite layer as shown in FIG. 13A, wherein electrical resistance reducing adhesion promoter layer 42 comprises an adhesion promoter 48 and conductive particles 40. Although conductive particles 40 are shown uniformly spaced, it is within the scope of this embodiment that conductive particles 40 be variously spaced throughout electrical resistance reducing adhesion promoter layer 42. As shown in FIG. 13A, at least portions of conductive particles 40 are in contact with both substrate 44 and substrate 46 to enhance the electrical conductivity between substrates 44, 46. Alternatively, as shown in FIG. 13B, electroehemical cell component 60 comprises an electrical resistance reducing adhesion promoter layer 62 disposed between a polymeric composite 64 and a metal substrate 66. electrical Electrical resistance reducing adhesion promoter layer 62 comprises an adhesion promoter 68 and conductive particles 69. In this embodiment, the bridge between substrates 64, 66 is provided by more than one conductive particle 69. It is within the scope of this disclosure that a single assembly may comprise both embodiments depicted in FIGS. 13A and 13B. In general, articles formed with the electrical resistance reducing adhesion promoter layer disclosed herein can exhibit a volume resistivity of about 0.001 to about 0.050 ohm-cm, and preferably about 0.030 ohm-cm or less.

The adhesion promoter—coated core is subsequently used for manufacture of electrochemical cell components using any suitable method known in the art, such as compression molding, transfer molding, injection molding or the like. As will be readily appreciated by one of ordinary skill in the art the method of applying the conductive polymeric composites is dependent upon the composition and physical properties such as the flow properties of the conductive composite formulation.

The conductive polymeric composite may then be cured, if necessary, by any suitable method known in the art such as a one-step cure or a two-step cure. The first step of a two-step cure process is a conventional peroxide cure step; and typical cure temperatures are between about 150° C. and about 200° C. If the method used to apply the conductive polymeric composite materials heats the conductive polymeric composite to a temperature between about 150° C. and about 200° C., then the application step also constitutes the first cure step. Compression molding is one method of applying the conductive polymeric coating that also functions as the first cure step. The second step of the cure process can either be a high temperature cure or high-energy electron beam cure (E-beam cure) or other irradiation cure. A high temperature cure comprises heating the article to temperatures greater than about 230° C. but less than the decomposition temperature of the material, generally about 400° C. under an inert atmosphere. E-beam curing is advantageous because it allows for controlled curing for a given system. The amount of curing (cross linking) is controlled by the total amount of radiation given to the article. The ability of the high-energy electrons to penetrate through the sample to specific depth is known as the penetration depth.

The E-beam source voltage controls the penetration depth, and different sources give different penetration depths.

Especially preferred electrochemical cell components, made as described above, include bipolar plates, end plates, current collectors and combinations of the foregoing.

The method of the invention is further illustrated by the following examples, which are meant to be illustrative, not limiting.

All of the above identified references, patents, and patent applications are hereby incorporated herein by reference in their entirety including incorporated material.

EXAMPLE 1

Aluminum plates 0.07 cm thick, 10.7 cm wide and 11.0 cm long were lightly abraded with sand-paper or other abrading means and subsequently washed with acetone and then pretreated with a 5% by weight solution of mercapto-functional silane, available from OSi Specialties under the trade name A-189, in acetone by dip coating. The solvent was allowed to evaporate under ambient conditions. The plate was subsequently transferred to a preheated die. A suitable amount of a conductive polybutadiene composite material was weighed out for proper fill of the mold cavity. The composition of the conductive polybutadiene composite material is shown in Table 1. The conductive polybutadiene composite was put into the mold cavity and compression molded onto the surface of the plate at 150° C. mold temperature, 10,000–12,000 pounds per square inch (psi) cavity pressure for 4 minutes. A typical dimension of the molded conductive polymeric composite is 10.6 cm×4.4 cm×0.5 cm. The final dimension for a finished part is dictated by the design and end-use requirements. These samples were further cured in an oven at 240° C. for 4 hours or longer depending on the degree of cure desired.

TABLE 1

| Component | Source, Trade Name | Vol. % |
|---|---|---|
| Liquid polybutadiene resin | Nisso B-3000 | 24.6 |
| Trimethylolpropane trimethacrylate | Sartomer SR-350 | 2.3 |
| t-Butyl perbenzoate | Triganox-C | 0.22 |
| Peroxide | Luprox 5OOR or Perkadox BC | 2.22 |
| Di-t-butyl-p-cresol | Ionol | 0.04 |
| Natural graphite | Asbury Graphite Mill, Inc., Asbury 3621 | 46.6 |
| Synthetic graphite | Asbury Graphite Mill, Inc., Asbury A99 | 24.0 |

The molded conductive polymeric composite/aluminum part was visually inspected for mechanical integrity and interfacial adhesion between the matrix and metal. These parts have very good electrical and solvent resistance properties. The cured composite material is rigid with good dimensional stability. As the composite/aluminum parts were heated and cooled in cooling cycles, no bowing of the samples were noted, proving that the temperature coefficient of expansion of the composite matched that of the aluminum. The composite/aluminum part had a volume resistivity of 0.052 ohm-cm according to IPC TM-650 and a thermal conductivity of 10.5 watts/meter ° K according to ASTM C518.

EXAMPLE 2

Aluminum plates 0.07 cm thick, 10.7 cm wide and 11.0 cm long were lightly abraded with sand-paper or other abrading means and subsequently washed with acetone and then pretreated with a 5% by weight solution of an aminosilane available from OSi Specialties under the trade name A1106, in acetone by dip coating. The solvent was allowed to evaporate under ambient conditions. The plate was subsequently transferred to a preheated die. A suitable amount of a conductive epoxy-based composite material was weighed out for proper fill of the mold cavity. The composition of the conductive epoxy-based composite material is shown in Table 2. The conductive polymeric composite was put into the mold cavity and compression molded onto the surface of the plate at 180° C. mold temperature, 10,000–12,000 pounds per square inch (psi) cavity pressure for 4 minutes. A typical dimension of the molded conductive polymeric composite was 10.6 cm×4.4 cm×0.5 cm. The final dimension for a finished part is dictated by the design and end-use requirements. These samples were further cured in an oven at 240° C. for 4 hours or longer depending on the degree of cure desired.

TABLE 2

| Component | Source, Trade Name | Vol. % |
|---|---|---|
| Epoxidized cresol novolac resin | Sumitomo Chemical Co., Sumiepoxy ESCN 195XL 25 | 11.73 |
| Epoxidized phenol novolac resin | DaiNippon Ink and Chemicals, Epiclon N-770 | 10.14 |
| Natural graphite | Asbury Graphite Mill, Inc., Asbury 3621 | 40.02 |
| Synthetic graphite | Asbury Graphite Mill, Inc., Asbury A99 | 20.69 |
| Calcium stearate | Mallinckrodt, Inc. | 3.45 |
| Phenol-formaldehyde polymer | Schenectady International, HRJ 11040 | 13.59 |
| 2,4,6-tris dimethyl-amino methyl phenol | Air Products and Chemicals, Ancamine K54 | 0.21 |
| Glycerol mono stearate | Lonza Group, Lonzest GMS | 0.17 |

The molded conductive polymeric composite/aluminum part was visually inspected for mechanical integrity and interfacial adhesion between the matrix and metal. These parts have very good electrical and solvent resistance properties. The cured composite material is rigid with good dimensional stability. As the composite/aluminum parts were heated and cooled in cooling cycles, no bowing of the samples were noted, proving that the temperature coefficient of expansion of the composite matched that of the aluminum. The composite/aluminum part had a volume resistivity of 0.068 ohm-cm according to IPC TM-650 and a thermal conductivity of 13.4 watts/meter ° K according to ASTM C518.

EXAMPLE 3

Aluminum plates 0.07 cm thick, 10.7 cm wide and 11.0 cm long were lightly abraded with sand-paper or other abrading means and subsequently washed with acetone and then pretreated with a 5% by weight solution of a vinyl silane, available from OSi Specialties under the trade name A172, in acetone by dip coating. The solvent was allowed to evaporate under ambient conditions. The plate was subsequently transferred to a preheated die. A suitable amount of a conductive epoxy-based composite material was weighed out for proper fill of the mold cavity. The composition of the conductive poly(diallyl phthalate) composite material is shown in Table 3. The conductive polymeric composite was put into the mold cavity and compression molded onto the surface of the plate at 180° C. mold temperature, 10,000–12, 000 pounds per square inch (psi) cavity pressure for 4 minutes. A typical dimension of the molded conductive polymeric composite is 10.6 cm×4.4 cm×0.5 cm. The final dimension for a finished part is dictated by the design and end-use requirements.

TABLE 3

| Component | Source, Trade Name | Vol % |
|---|---|---|
| Poly(diallyl phthalate) | Daiso Company, Ltd., Daiso A | 13.44 |
| Poly(diallyl phthalate) | Daiso Company, Ltd., Daiso K | 6.72 |
| Natural graphite | Asbury Graphite Mill, Inc., Asbury 3621 | 50.96 |
| Synthetic graphite | Asbury Graphite Mill, Inc., Asbury A99 | 26.29 |
| Diallyl phthalate monomer | Daiso Company, Ltd. | 0.38 |
| Trimethylolpropane trimethylacrylate | Sigma Aldrich, Sartomer 350 | .087 |
| t-Butyl perbenzoate | Akzo Nobel, Triganox C | 0.84 |
| Dicumyl peroxide | Akzo Nobel, Perkadox BC | 0.47 |
| Butyrated hydroxy toluene | PMC Specialty Group, Ionol | .04 |

The molded conductive polymeric composite/aluminum part was visually inspected for mechanical integrity and interfacial adhesion between the matrix and metal. These parts have very good electrical and solvent resistance properties. The composite material is rigid with good dimensional stability. As the composite/aluminum parts were heated and cooled in cooling cycles, no bowing of the samples were noted, proving that the temperature coefficient of expansion of the composite matched that of the aluminum. The composite/aluminum part had a volume resistivity of 0.0567 ohm-cm according to IPC TM-650 and a thermal conductivity of 7.82 watts/meter ° K according to ASTM C-518.

As seen in the preceding examples the electrochemical cell component has excellent chemical resistance, good mechanical integrity, and good conductivity. Notably, the conductive polymeric composite of the electrochemical cell component does not separate from the core under electrochemical cell conditions. Furthermore they have a volume resistivity of about 0.500 ohm-cm or less, preferably about 0.116 ohm-cm or less, more preferably about 0.045 ohm-cm or less, and a thermal conductivity of at least about 5 watts/meter ° K, preferably about 7 watts/meter ° K, and more preferably at least about 13 watts/meter ° K. In addition, it is economical to produce because it can be produced using currently available methods and equipment.

EXAMPLES 4–20

Silquest A-189 silane was purchased from Osi Specialties, Middlebury, CT; GL-0279 was supplied by Mo-Sci Corporation; S-3000 S3M and SH400S33 were obtained from Potters Industries Inc, Valley Forge, Pa.; and nickel-coated graphite and HCA-1 were supplied by Novamet Specialty, Products, Wyckoff, N.J.

Samples for testing volume resistance were prepared by pre-washing aluminum plates having varying thicknesses. The cleaned aluminum plates (with the exception of Example 15 as indicated in Table 1) were then coated on both sides with a suspension of conductive particles in various media as summarized in Table 4. Additional samples for testing volume resistance were prepared by depositing a silane layer (controls) or an epoxy resin comprising conductive particles (controls) on an aluminum plate. Any solvent remaining was removed by air drying. The epoxy resins were cured at 150° C. for 30 minutes. The coated aluminum plate was placed between two layers of uncured electrically conductive polymeric composites placed in a compression mold cavity. The polymeric composite formulation 10305-40 comprised 84 wt % of graphite particles and 16 wt % of uncured vinyl resins; polymeric composite formulation 10307-5A comprised 80 wt % of graphite and 20 wt % of vinyl resins, and polymeric composite formulation 10307-5 comprised 63 wt % graphite and 37 wt % vinyl resins. Compression molding was performed at a temperature of 155° C. under pressure of 6,000 pounds per square inch (psi) for 5 minutes to prepare a three-layered assembly, polymer/metal substrate/polymer.

Volume resistance was measured under pressure of 300 pounds per square inch (psi) at room temperature using an A-4479 press made by Janesville Tool and Manufacturing, Milton, Wis. The A-4479 press was equipped with gold-plated electrodes, which are electrically connected with a DC power supply, WP-707B manufactured by Vector-Vid and a Nonvolt/micro ohm meter, 34420A from Hewlett Packard. The assembly was subjected to post-cure at 200° C. for 3 hours to complete the cure reaction of resins, and volume resistance was measured again.

The compositions and the data obtained from volume resistance measurements are below in Table 4:

TABLE 4

| | Aluminum Plate | | | | Volume Resistance (ohm-cm) | |
|---|---|---|---|---|---|---|
| Sample No. | Thickness, (mil) | Conductive Particle and concentration, (vol %) | Suspension Medium | Assembly Thickness (mil) | Before postcure | After postcure |
| 4 | 80 | GL-0279$^a$ (<29%) | 5% silane solution | 199 | 0.0304 | 0.0310 |
| 5 | 80 | GL-0279$^a$ (18%) | 5% silane solution | 207 | 0.0147 | 0.0214 |
| 6 | 80 | GL-0279$^a$ (19%) | 5% silane solution | 209 | 0.0165 | 0.0306 |
| 7 | 80 | GL-0279$^b$ (19%) | 5% silane solution | 215 | 0.0149 | 0.0191 |
| 8 | 80 | S-3000 S3M$^c$ (18%) | 5% silane solution | 213 | 0.0141 | 0.0268 |
| 9* | 80 | — | Silane only | 212 | 0.0624 | 0.2900 |
| 10 | 80 | S-3000 S3M$^c$ (18%) | 5% silane solution | 211 | 0.0262 | 0.1305 |
| 11* | 80 | — | Silane only | 211 | 1.1769 | 0.5541 |
| 12* | 30 | S-3000 S3M$^c$ (27%) | Epoxy resin | 175 | 0.3964 | 4.2015 |
| 13* | 30 | S-3000 S3M$^c$ (29%) | Epoxy resin | 174 | 0.2184 | 4.1436 |
| 14* | 30 | S-3000 S3M$^c$ (30%) | Epoxy resin | 172 | 0.1311 | 2.5112 |
| 15* | 30 | S-3000 S3M$^c$ (31%) | Epoxy resin | 152 | 0.3097 | 2.9745 |

TABLE 4-continued

| Sample No. | Aluminum Plate Thickness, (mil) | Conductive Particle and concentration, (vol %) | Suspension Medium | Assembly Thickness (mil) | Volume Resistance (ohm-cm) | |
|---|---|---|---|---|---|---|
| | | | | | Before postcure | After postcure |
| 16* | 30 | S-3000 S3M[c] (32%) | Epoxy resin | 172 | 0.2117 | 3.3423 |
| 17 | 30 | 75% NCG[d] (12%) | 5% silane solution | 218 | 0.0166 | 0.0154 |
| 18 | 30 | 75% NCG (100%)[e] | Silane pre-coat[f] | 218 | 0.0252 | 0.0216 |
| 19* | 30 | — | Silane only | 210 | 0.1093 | 0.5732 |
| 20 | 30 | SH400S33[e] (30%) | 5% silane solution | 168 | 0.0178 | 0.0166 |
| 21 | 80 | Nickel[g] | (g) | 142 | 0.0403 | 0.0306 |

*Control
[a]Silver-coated solid glass spheres (1–20 micrometers) from Mo-Sci Corporation.
[b]Silver-coated solid glass spheres (50–105 micrometers) from Mo-Sci Corporation.
[c]Silver-coated solid glass spheres (41 micrometers) from Potters Industries.
[d]Nickel-coated graphite (75 wt % Ni) from Novamet Specialty Products Corporation.
[e]Silver-coated hollow glass spheres (14 micrometers) from Potters Industries.
[f]Particles are sprinkled over dried silane layer (same concentration).
[g]AC-78 from Alchemetal Corp.

As may be seen from Samples 4–8, the use of conductive particles in combination with a silane decreases the volume resistance by up to about 93.5% after postcure compared to Sample 9. Furthermore, by varying the particle size range of the silver-coated glass sphere from 1–20 micrometers to 50–105 micrometers, a decrease of up to about 38% of the volume resistance after postcure is observed.

Samples 12–16 utilize an epoxy rather than silane as the adhesion promoter. As shown by Table 4, the resistance is much higher, despite use of a relatively larger amount of conductive particles.

Example 18 was prepared as described above except the aluminum plate was coated with a solution of silane and the conductive particles were sprinkled on the dried silane layer.

Comparing Samples 17 and 18, applying the conductive particle dispersed in solution with the silane prior to applying the electrical resistance reducing composition solution onto the aluminum plate, results in a 29% decrease in the volume resistance as compared to a method of sprinkling the nickel-coated graphite over the dried silane. However, both methods exhibit up to about a 96% decrease in volume resistance when compared to a sample prepared with silane but without conductive particles (Sample 16). Example 17, comprising a silver-coated hollow glass sphere, exhibited a similar volume resistance after postcure as Example 20 comprising nickel-coated graphite.

As seen in the preceding examples, the use of an electrical resistance reducing adhesion promoting layer between two substrates significantly reduces the interfacial resistance between the substrates as demonstrated by the decreased volume resistance.

While preferred embodiments have been shown and described, various modifications and substitutions may be made thereto without departing from the spirit and scope of the invention. Accordingly, it is to be understood that the present invention has been described by way of illustration and not limitations.

We claim:

1. In an electrochemical cell, an electrically conductive component comprising
    an electrically and thermally conductive core having a first aperture therethrough, the core further comprising an active area; and
    an electrically and thermally conductive polymeric composite substantially covering the active area of the conductive core, and substantially covering the surfaces forming the first aperture to provide a second aperture, and adhered to the active area of the core and the aperture surfaces by a first adhesion promoter layer, wherein the adhesion promoter layer comprises electrically conductive particles.

2. The electrochemical cell component of claim 1, wherein the component additionally comprises a channel for conducting a fluid.

3. The electrochemical cell component of claim 2, wherein the composite is molded to form the channel.

4. The electrochemical cell component of claim 3, wherein the channel is non-conformal to the underlying conductive core.

5. The electrochemical cell component of claim 1, wherein the core additionally comprises a heat transfer area extending beyond the active area.

6. The electrochemical cell component of claim 5, wherein the heat transfer area is in the form of a cooling fin.

7. The electrochemical cell component of claim 1, wherein the conductive particles comprising carbon, conductive metals, conductive metal alloys, conductive intermetallics, or a combination comprising one or more of the foregoing conductive particles.

8. The electrochemical cell component of claim 7, wherein the conductive particles comprise silver, nickel, or silver and nickel.

9. The electrochemical cell component of claim 1, wherein the adhesion promoter is a conductive polymer.

10. The electrochemical cell component of claim 1, wherein the electrically and thermally conductive polymeric composite is adhered to all surfaces that form the aperture.

11. In an electrochemical cell, an electrically conductive component comprising
    an electrically and thermally conductive core;
    an electrically and thermally conductive polymer composite substantially covering the core; and
    a first adhesion promoter layer comprising a conductive polymer and electrically conductive particles disposed between and in intimate contact with the core and the conductive polymer composite, wherein the electrochemical cell component has a volume resistivity of about 0.050 ohm-cm or less.

12. The electrochemical cell component of claim 11, wherein the conductive polymer comprises polyacetylene, polythiophene, polypyrrole, polyaniline, poly-p-phenylenevinylene, their derivatives, or a combination comprising at least one of the foregoing polymers.

13. The electrochemical cell component of claim 11, wherein the conductive particles comprise carbon, conductive metals, conductive metal alloys, conductive intermetallics, or a combination comprising one or more of the foregoing conductive particles.

14. The electrochemical cell component of claim 13, wherein the conductive particles comprise silver, nickel, or silver and nickel.

15. The electrochemical cell of claim 11, wherein the conductive polymer composite comprises a polybutadiene- or polyisoprene-containing polymer.

* * * * *